United States Patent [19]
Onodera

[11] Patent Number: 5,560,015
[45] Date of Patent: Sep. 24, 1996

[54] COMPILER AND METHOD OF COMPILATION

[75] Inventor: Tamiya Onodera, Tokyo, Japan

[73] Assignee: International Business Machines Corporation, Armonk, N.Y.

[21] Appl. No.: 454,446

[22] Filed: May 30, 1995

Related U.S. Application Data

[63] Continuation of Ser. No. 6,335, Jan. 19, 1993, abandoned.

[30] Foreign Application Priority Data

Jan. 17, 1992 [JP] Japan ................................. 4-006093

[51] Int. Cl.$^6$ ...................................................... G06F 9/45
[52] U.S. Cl. ...................... 395/700; 364/280; 364/280.4; 364/238.4; 364/246; 364/DIG. 1
[58] Field of Search ...................... 395/700; 364/DIG. 1

[56] References Cited

U.S. PATENT DOCUMENTS

| | | | |
|---|---|---|---|
| 4,885,684 | 12/1989 | Austin et al. ............................. | 364/300 |
| 5,170,465 | 12/1992 | McKeeman et al. .................... | 395/700 |
| 5,182,806 | 1/1993 | McKeeman et al. .................... | 395/700 |
| 5,204,960 | 4/1993 | Smith et al. ............................. | 395/700 |
| 5,345,086 | 9/1994 | Bertram .................................. | 250/558 |

*Primary Examiner*—Alvin E. Oberley
*Assistant Examiner*—Majid A. Banankhah
*Attorney, Agent, or Firm*—Michael J. Buchenhorner

[57] ABSTRACT

A method and program for compiling a source program composed by using one or more program modules. Each program module consists of a first part which defines specifications and a second part which performs functions. The compilation method comprises the steps of:

(1) detecting an encounter with a stage using a program module while a source program is analyzed by a compiler object;

(2) interrupting the compiler object in operation in response to said detection;

(3) searching automatically for said first part of said program module in response to said detection;

(4) compiling said first part of said program module thus searched out automatically by a new compiler object; and (5) resuming said compilation by said interrupted compiler object after compilation of said first part of said program module.

6 Claims, 3 Drawing Sheets

COMPILER AND METHOD OF COMPILATION

This is a continuation of application Ser. No. 08/006,335 filed on Jan. 19, 1993, now abandoned.

BACKGROUND OF THE INVENTION

This invention relates to computer compilers for modular programming languages and more particularly to a compiler that allows module interfaces to be read automatically.

A programming technique known as "modular programming" was proposed more than ten years ago in order to cope with growing software developments in scale (Parnas, D. "A technique for software module specification", Comm.ACM 15, 5 (May 1972), pp330–336). Languages such as Ada and Modula-2 have a syntax that positively supports such programming.

Even in programming in C language, which lacks any such syntactical support, coding in modular programming style is widely put into practice. By this technique, programs are composed of a group of modules. One module is an aggregate of logically associated data and functions, which is defined by an interface and implementation. The former determines how to use a module, whereas the latter represents how to implement a module.

The most notable feature of modular programming lies in the restrictive interrelation of modules. That is, any module, M, discloses only its interface to other modules to make use of M (clients of M), but the implementation of M is completely concealed from any such clients. This makes it possible to proceed with program development while localizing the influence on the entire program of a modification in some part of a program. Thus it becomes possible to make modifications in implementation independently of clients.

In such modular programming, however, it is necessary to read in advance an interface with module M when a client of module M is compiled. Specification of such reading varies from language to language, yet it is at any rate left to a programmer's manual work. For example, a module using three modules, Symbol, String, and List would in Ada begin with the following three "with clauses":

with Symbol;

with String;

with List, and would in C or C++ begin with the following three # include instructions respectively:

include "Symbol.h"

include "String.h"

include "List.h"

Yet, in this instance, the interface with the module "Symbol" is assumed to be in a file, Symbol.h.

Such explicit management of "reading" by a programmer is more complicated in an object-oriented language. That is, with object-oriented languages, there exist semisequential relations between modules ascribed to "inheritance" and therefore the module reading sequence also has to follow the semisequential relations.

During development of a program, a module group that a module uses at certain times may change frequently. A programmer is requested to arrange with-clauses or # include instructions in proper sequence without creating inconsistencies in spite of such frequent change. This may significantly impair the productivity of software.

DESCRIPTION OF THE PREFERRED EMBODIMENT

This invention will be explained for an embodiment in which an object-oriented language based on C, hereinafter called COB, is applied to a compiler, in reference to the drawings.

This invention has been made taking the above-stated circumstances into consideration and is intended to provide a compiler capable of reading interfaces automatically at compilation. A compiler of this type allows overall management of interface reading by itself and thus enables the efficiency of software development to be improved by entirely relieving a programmer from the burden of reading.

In order to achieve the above-mentioned object, this invention is arranged in such a manner that, during compilation of a module, if a phase in which another module is in use is encountered, and the interface of that another module has not yet been read, a file containing the interface is automatically searched, and immediately read for syntax analysis. In this connection, there are three problems to clear: (1) the compiler must be able to recognize such phases in which a module is in use; (2) it must be possible to establish correspondence between a module name and an interface file name; and (3) the compiler must be able to interrupt the current syntax analysis and to proceed to the syntax analysis of another text.

A technique for solving the first problem depends on the syntax of the programming language involved. With C++, it is possible to recognize these phases by using as clues the types of variables and expressions or tokens. The second problem can be solved by applying the rule of correspondence. The third problem can be solved if the parser (a routine for syntax analysis) and the lexer (a routine for phraseological analysis) are reentrant. In this respect, it is feasible to make the parser and lexer reentrant by implementing them as objects in object-oriented programming.

Figure 1:
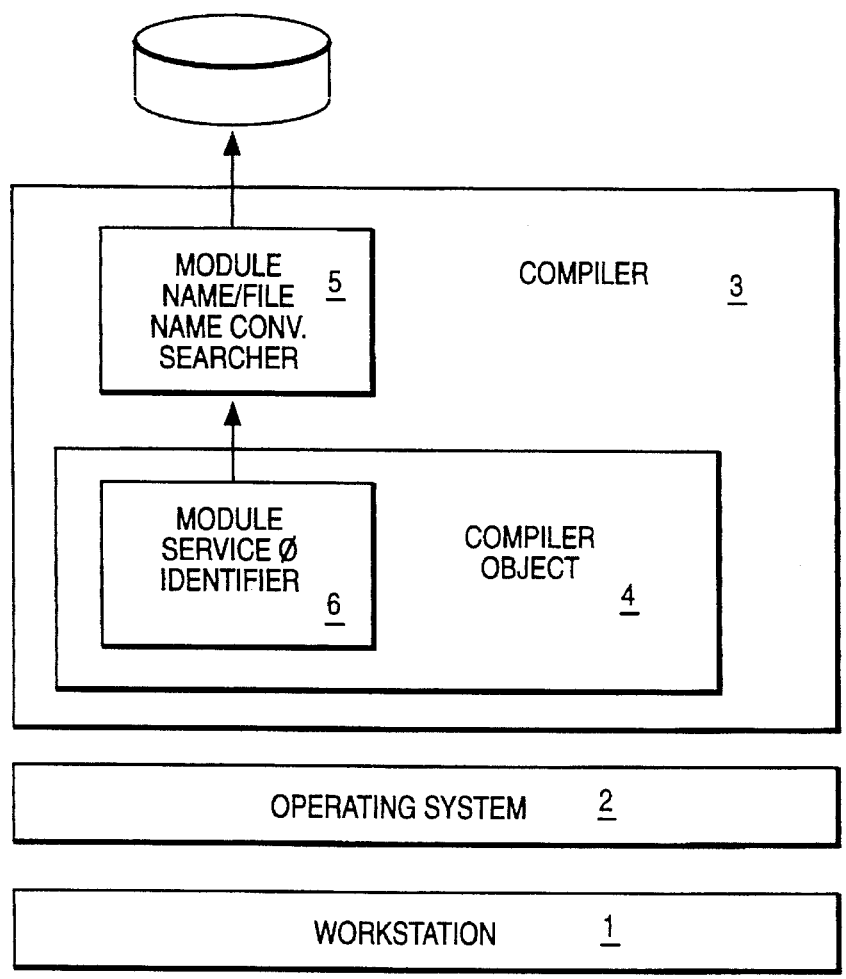
FIG. 1 is a block diagram of an embodiment of this invention.

FIG. 1 is a schematic representation of an embodiment of this invention. In Figure, block 1 is a workstation; block 2, an operating system; and block 3, a compiler. The workstation 1 may, for example, be an RS6000 trademark) workstation by International Business Machines Corporation. The operating system 2 may be an AIX (Advanced Interactive Executive) by International Business Machines Corporation, for example. The compiler 3 consists of a compiler object 4 and a module name/file name conversion searcher 5; the compiler object 4 includes a module service phase identifier 6 as well. The compiler object 4, module name/file name conversion searcher 5, and module service phase identifier 6 will be detailed later.

Figure 2:
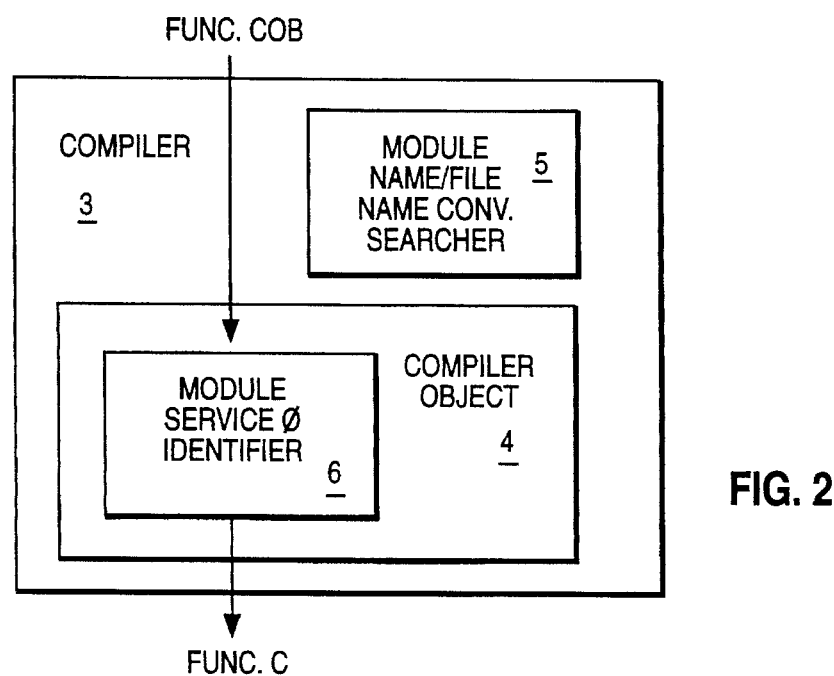
FIG. 2 is an explanatory drawing of the operation of the embodiment.
Figure 3:
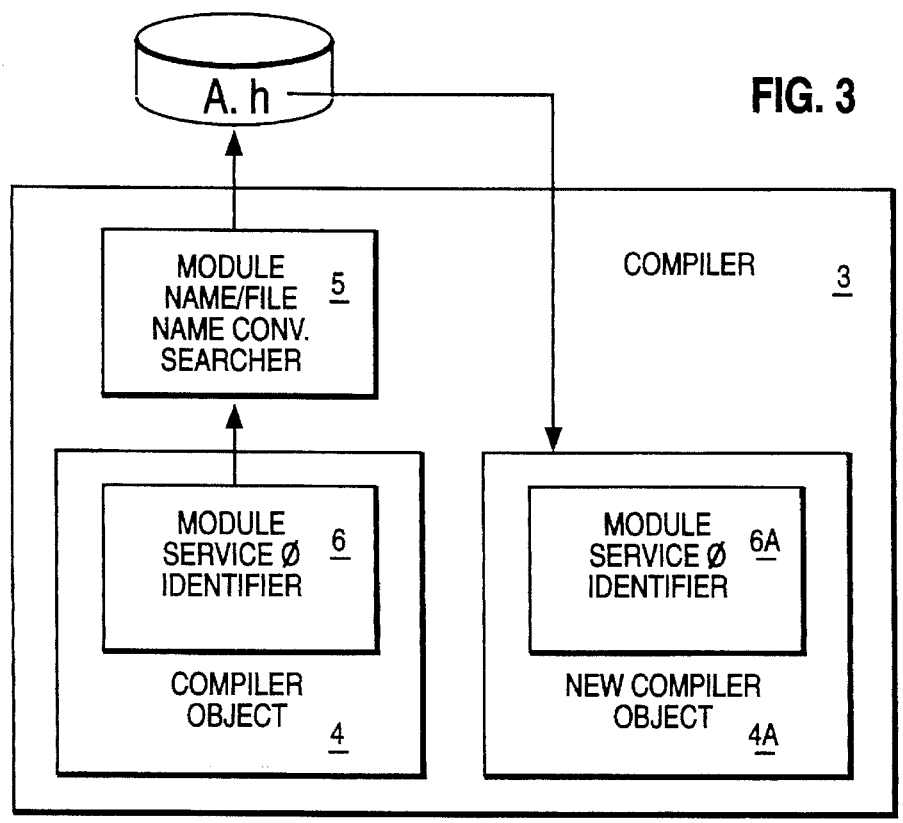
FIG. 3 is an explanatory drawing of the operation of the embodiment.
Figure 4:
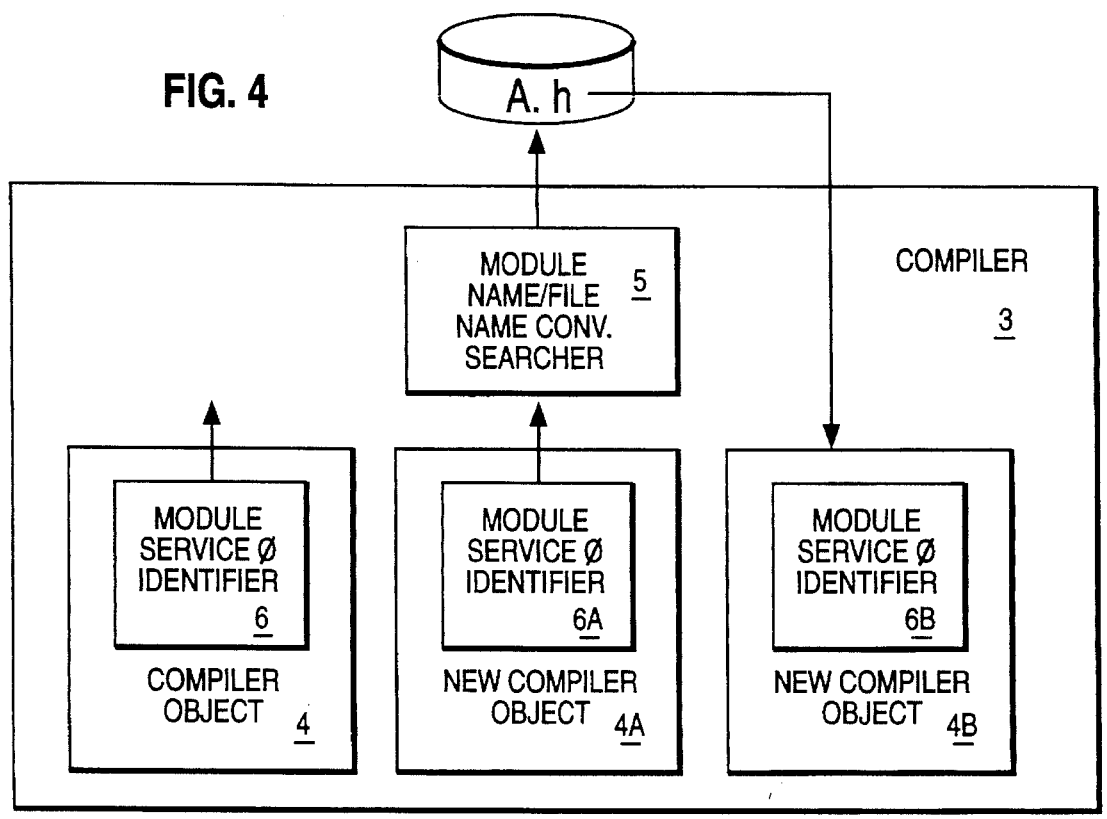
FIG. 4 is an explanatory drawing of the operation of the embodiment.

The following discussion outlines the operation of a compiler in accordance with the invention, using as an example a source program named FUNC.COB which uses a module named A, referring also to FIGS. 2 to 4. Module A is assumed to be using module B.

The nucleus of the compiler 3 is the compiler object 4. The compiler object 4 reads the source program, FUNC- .COB, analyzes its syntax, and outputs an object program, FUNC.C. When the compilation of the source program, FUNC.COB, reaches a part using module A, as shown in FIG. 3, (a) the module service phase identifier 6 of the compiler object 4 identifies the part and (b) generates a new compiler object 4A; (c) the module name/file name conversion searcher 5 generates a corresponding interface file named, A.h, from the module name, and searches out that file, (d) which is then input to the compiler object 4A. When the compilation of A.h by the compiler object 4A reaches a part using module B, as shown in FIG. 4, the module service phase identifier 6A of the compiler object 4A identifies the part, and a new compiler object 4B is generated; the module name/file name conversion searcher 5 searches out a file, B.h, retaining an interface to module B, which is then input to the compiler object 4B. When the interface file, B.h, has been compiled, the compiler object 4B disappears (FIG. 3), so that the compiler object 4A resumes the compilation of the interface file, A.h. When the compilation ends, the compiler object 4A disappears (FIG. 2), so that the compiler object 4 resumes the compilation of the source program, FUNC.COB. Upon completion of all compilation, the compiler object 4 disappears as well.

The following explains how to produce the compiler object 4. The compiler object is what is called an object in object-oriented programming and accordingly forms a "compiler class" in actual programming.

A notable feature of this method is that a compiler class is created by converting a parser and a lexer generated in the AIX by a common method into a class in an object-oriented programming language based on C language (COB). That is, the compiler class consists of a classed parser (a parser class) and a classed lexer (a lexer class).

In AIX, the parser and lexer are usually generated by a parser generator, yacc, and a lexer generator, lex. The parser generator, yacc, receives a file describing rules of syntax as input and generates a program in C including a function (parser) named yyparse() on the basis of a file named yaccpar. Similarly, the lexer generator, lex, receives a file describing phrase patterns as input and, on the basis of a file named ncform, generates a program in C that includes a function (lexer) named yylex().

Figure 5:
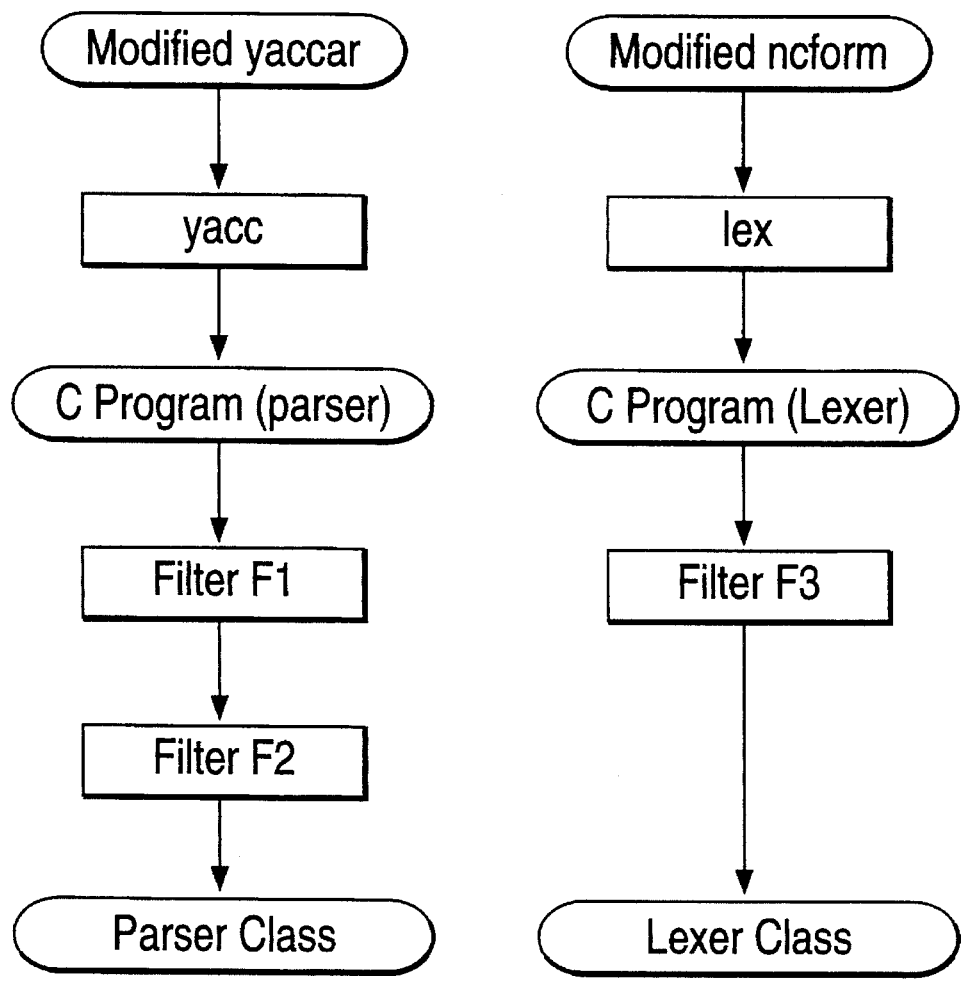
FIG. 5 is an explanatory block diagram of the compiler object for the embodiment.

The parser and the lexer programs thus generated in C are converted into their corresponding parser class and lexer class which are classes of COB. Table 1 lists the general syntax of class definitions in COB. Also, Tables 2 and 3 list the interfaces with the parser class and the lexer class. To convert a program in C into a class of COB, a sequence of text processing is performed on the program in C so as to transform global variables in C into instance variables or common variables in COB, and functions in C into instance functions or common functions in COB (FIG. 5). In this case, yaccpar and ncform as templates of yacc and lex are modified in advance as in Tables 4 and 5. Also, filters 1 to 3 are an ed script or a sed script as listed in Tables 6 to 8. The former is a program for the AIX editor, ed, whereas the latter is a program for the AIX stream editor, sed.

TABLE 1

Syntax of class definitions in COB class class-name {
    //Declarations of functions in C
    //to become an instance method common:
    //Declarations of functions in C TABLE 1-continued Syntax of class definitions in COB //to become a common method }; class impl class-name {
        //Declarations of global variables in C
        //to become instance variables common:
        //Declarations of global variables in C
        //to become common variables definition:
        //Definitions of functions in C };

TABLE 2

Interface with parser class, Yacc class Yacc{
    int yydebug=0;
    YYSTYPE yylval;
    void init(class Lex);
    int yyparse(void); };

TABLE 3

Interface with lexer class, Lex class Lex{
    YYSTYPE yylval;
    overload void init(FILE *in,FILE *out);
    overload void init(FILE *in);
    overload void init(void);
    int yylex(void);
    int yywrap(void);
    int yyinput (void);
    void yyoutput(int c);
    void yyunput(int c); };

TABLE 4

Modified yaccpar ifdef COB #else int yydebug;        /* set to 1 to get debugging */ #endif
    (omitted because it is the same as above) /* ** global variables used by the parser */ #ifdef COB
include "/usr/local/cob/lib/lex.dec" #include "/usr/local/cob/lib/yacc.dec" class impl Yacc {
    class Lex lex;
    YYSTYPE yyval;
    YYSTYPE yyv[YYMAXDEPTH ]; /* value stack */
    int *yys;         /*state stack */
    int yypv;
        int yypvt;
        int *yyps;                    /* top of state stack */
        int yystate;                  /* current state */
        int yytmp;                    /* extra var (lasts between blocks) */
        int yynerrs;                  /* number of errors */
        int yyerrflag;                /* error recovery flag */
        int yychar;                   /* current input token number
/* definition:
        void init(class Lex lex) {
            self->lex=lex;
            self->yys=(int*)malloc(sizeof(int)*YYMAXDEPTH);
        }
        /*
        ** yyparse - return 0 if worked, 1 if syntax error not recovered from       */
        int yyparse(void) { #else YYSTYPE yyv[
            YYMAXDEPTH;
/* value stack */ int yys YYMAXDEPTH;           /* state stack */ YYSTYPE *yypv;         /* top of value stack
*/ YYSTYPE *yypvt;        /* top of value stack for $vars
*/ int *yyps;                    /* top of state stack */
int yystate;                  /* current state */ int yytmp;

TABLE 4-continued

Modified yaccpar

/* extra var (lasts between blocks) */ int yynerrs;
/* number of errors */ int yyerrflag;
/* error recovery flag */ int yychar;    /*
current input token number */
*/ ** yyparse - return 0 if worked, 1 if syntax error
not recovered from */
int yyparse() {#endif
(omitted because it is the same as above) #ifdef
COB }; #endif

TABLE 5

Modified ncform

The steps #ifdef to #else and #endif are added anew.
It should be noted that modifications are validated only
when they are subjected to the COB processing system with
the -DCOB option.

```
#ifdef COB #include "/usr/local/cob/lib/lex.dec"
class impl Lex {
int yyleng;
int yymorfg;
int yytchar;
FILE *yyin = {stdin}, *yyout = {stdout};
struct yysvf *yyestate; /* ::instance:: */
    int yylineno =1;
char *yytext; YYLMAX
struct yysvf **yylstate; YYLMAX
struct yysvf **yylsp, **yyolsp;
char *yysbuf; YYLMAX
char *yysptr; = yysbuf;
int *yyfnd;
int yyprevious = YYNEWLINE;
int yylook(void);
int yyback(int *,int); definition:
overload void init(void) {
    self->yysptr=self->yysbuf=malloc(YYLMAX);
    self->yytext=malloc(YYLMAX);
    self->yylstate=(struct
yysvf**)malloc(sizeof(struct yysvf*)*YYLM AX);    }
    overload void init(FILE *in) {
        self->yyin=in;
        self->init(); }
    overload void init(FILE *in,FILE *out) {
        self->yyln=in;
        self->yyout=out;
        self->init();}
    int yylex(void) {
        int nstr; /* ::yylex:: */
    int yylook(void) { #else int yylineno =1; char
yytext[YYLMAX]; struct yysvf *yylstate [YYLMAX], **yylsp,
**yyolsp; char yysbuf[YYLMAX]; char *yysptr = yysbuf;
int *yyfnd; extern struct yysvf *yyestate; int
yyprevious = YYNEWLINE; yylook() { #endif
(omitted because it is the same as above) #ifdef
COB
    int yyback(int *p, int m) {
        if (p==0) return(0);
        while (*p)
        {
            if (*p++ == m)
                return(1);
        }
        return(0);
    }
    /* the following are only used in the lex
library */
    int yyinput(void) {
        return(input());
    }
    void yyoutput(int c) {
        output(c);
    }          void yyunput(int c) {
```

TABLE 5-continued

Modified ncform

```
        unput(c);
    } }; #else yyback(p, m)         int *p; (if
(p==0) return(0); while (*p)
    {
        if (*p++ == m)
            return(1);
    } return(0); } /* the following are only
used in the lex library */ yyinput () {
        return(input());
    } yyoutput(c)
    int c; {
        output(c);
    } yyunput(c)
    int c; {
        unput(c);
    } #endif
```

TABLE 6 ed scripts for producing parser class, Yacc

/static yyf[0–9 *() {/,$m/int yyparse(void)/–1 w q

TABLE 7 sed scripts for producing parser class, Yacc

/static yyf/,/static (\*yyf[ )/s/yyval/(self–>yyval)/g
/static yyf/,/static (\*yyf[ )/s/yypvt/(self–>yypvt)/g
/static yyf/,/static (\*yyf[ )/s/yyvV[/(self–>yyv)[/g
/static yyf\)[0-9 *\) () {/s int yyf\1(class Yacc self)
{/g /static (\*yyf[ ) ()/s int (*yyf[)(class Yacc)/g
/extern int (\*yyf[ ) ();/d /(\*yyf¥[yytmp\ ) ()/s
(*yyf[yytmp )(self)/g /#define yyclearin yychar = –
1/s/yychar/self–>yychar/g /#define yyerrok yyerrflag
= 0/s/yyerrflag/self–>yyerrflag/g

TABLE 8 ed scripts for producing lexer class, Lex

/int yyleng; extern/,/struct yysvf/–1d /struct yysvf
\*yyestate;/,/ \*yybgin;/c extern struct yysvf yysvec[
; .
/yylex(){/d d .,/int yystop\[V–1m/::yylex::/ /struct
yywork \*yytop = /m/::instance::/ /struct yysvf \*yybgin =
/m/::instance::/ w q The module service phase identifier 6 of the compiler object will be explained. The identifier 6 identifies the service phases of an unknown module on the basis of the types of variables and expressions or tokens. In the programming language, COB, there are six service phases of a module (called a class in COB):

1) Access to common members of a class
2) Access to instance members of a class
3) Comparison between expressions of the class type
4) Substitution of expressions of the class type
5) Type conversion of expressions of the class type, and
6) Accession to a class These are identified on the basis of phrase analysis or syntax analysis. In COB, the module service phase identifier is embedded in the syntax analyzer and the phrase analyzer of a compiler object.

Of the above-mentioned six phases, the first one is identified by the phrase analyzer and the rest by the syntax analyzer. The phrase analyzer of a COB compiler is generated by providing a phrase pattern for lex. Table 9 lists a phrase pattern corresponding to the phase-1 identifier. The syntax analyzer of a COB compiler object is generated by providing rules of syntax for yacc. Table 10 lists such rules of syntax corresponding to those parts which identify phases 2 to 6.

TABLE 9

Phrase pattern corresponding to phase-1 identifier ({letter}|_) ({letter}|{digit}|_) *{blank}*"@"{blank}*
{ident}

TABLE 10

Syntax rules for identifiers of phases 2 to 6 expression
    | primary_expression ARROW field-name /* phase-2 */
    | expression EQ expression     /* phase-3 */
    | expression '=' expression     /* phase-4 */
    | '(' type_name ')' expression %prec UNOP /* phase-5 */
class_declaration
    | CLASS class_name '<' superclass_list '{'  /* phase -6 */

The following explains how the module name/file name conversion searcher 5 works. The conversion searcher 5 basically generates the file name "M.h" from the module name "M", and searches through the current directory for a file bearing this name. Since, however, such fixed conversion does not suffice for practical purposes, the following three types of customizing commands are also provided. These commands are offered as options at the activation of the compiler:

(1) path <directory-name>: Specifies a directory to be searched. If there are two or more directories, they are searched through in the order of specification of options.

(2) tail <tail-name>: Specifies an extension of a file that contains an interface. If there are two or more files, they are used in the order of specification and the file detected first is read.

(3) map <module-name><base-name>: Indicates that the interface with a module specified by the first argument exists in a file having a base name specified by the second argument.

In the embodiment in the programming language COB, the module name/file name conversion searcher 5 is controlled with three variables. Table 11 lists these variables along with their initial values (default values). The above-mentioned three options are provided to change the values of these variables. Table 12 gives an outline of the program segment corresponding to each option. Also, Table 13 gives an outline of the program for the main part of the conversion searcher that is controlled with these three variables.

TABLE 11

Variables controlling module name/file name conversion searcher stringlist pathlist=("."); stringlist
taillist=(".h"); map[string,string] kmmap=(); /* empty */

TABLE 12

Program segment modifying control variables of module name/file name conversion searcher void path(string pathname) {
    pathlist=cons(pathname,pathlist); }
void tail(string tail) {       taillist=cons(tail,taillist); }
void map(string classname, sting modulename) {
    map_put(kmmap,classname,modulename); }

TABLE 13

Main program segment of module name/file name conversion searcher

/* * open an interface file * corresponding to class name 'kname'. */ FILE *mopen(string kname) {
    string mname;
    FILE *fp;
    if ((mname=map_get(kmmap,kname)) !=NULL) { /* if there is a map, use it. */
    return mopen_search(mname);
    }
    else {
        for t in taillist { /* try alternative extensions one by one. */
        mname=strcat(kname,t)
        if ((fp=mopen_search(mname)) !=NULL)
        return fp;
    }    return NULL;
    } }
FILE *mopen_search(string mname) {
    FILE *fp;
    for p in pathlist { /* search through the directories on the pathlist one by one. * /
    if ((fp=fopen(strcat(p,"/",mname),"r")) !=NULL)
    /* found */
        return fp;
    }
    return NULL;    /* not found anywhere */}

As has been explained so far, this invention obviates the need for a programmer to specify reading of an interface in modular programing and thus improves software productivity. Therefore, what is claimed is:

I claim:

1. A method for compiling a source program comprising one or more program modules, each program module consisting of a first part which defines specifications and a second part which performs functions, said compilation method comprising steps of:

detecting an encounter with a compilation phase during which a program module, not previously read, is being used while a source program is analyzed by a compiler object;

interrupting the compiler object in operation in response to said detection;

searching automatically for said first part of said program module in response to said detection;

generating a new compiler object, and compiling said first part of said program module thus searched out automatically by the new compiler object; and resuming said compilation by said interrupted compiler object after compilation of said first part of said program module.

2. A compiler program embodied on a computer readable medium for compiling a source program, the source program comprising one or more program modules, each program module comprising a first part which defines an interface and a second part which performs functions, said compiler program comprising:

a compiler object for compiling the source program;

program module phase detection means for detecting a compilation phase, during compilation of a first program module, in which a second program module is being used, said second module not previously read during the compilation;

interrupting means for interrupting compilation on said detection;

first searching means, responsive to said detection, for searching automatically for the first part of the second program module;

compiling means for compiling the first part of the second program module, after reading thereof by the reading means; and resuming means for resuming the compilation of the first module after compilation of said first part of the second program module.

3. The compiler program of claim 2, wherein said automatic searching means comprises mapping means for mapping module names and file names of said first part of said second program module and second searching means for searching for a file specified by said mapping.

4. A compiler program embodied on a computer readable medium for compilation of a source program, the source program comprising one or more program modules, each program module comprising a first part which defines interfaces and a second part which performs functions, said compiler program comprising:

a first compiler object comprising:

means for reading the source program;

means for analyzing the syntax of the source program;

means for producing a compiled program; and a module service phase identifier including:
means for identifying a phase of the compilation of a first program module wherein the first program module uses a second program module; and
means for generating a second compiler object for compiling the first part of the second program module; and a module name and file name conversion searcher comprising:

means for generating a interface file comprising the first part of the second program module, and means for searching out the interface file; and means for providing an input, indicating the interface, to the second compiler object.

5. A computer program embodied on a computer readable medium for controlling a method for compiling a source program, the source program comprising at least first and second program modules, each program module consisting of a first part which defines interfaces for the program module, and a second part which performs functions, said method comprising steps of:

detecting an encounter with a compilation phase, during compilation of the first program module, in which the second program is being used by the first program module;

interrupting the compilation of the first program object in response to said detection;

searching automatically for the first part of the second program module in response to said detection;

compiling the first part of the second program module; and resuming the compilation of the first program module, after compilation of said first part of the second program module.

6. An article of manufacture comprising a computer program embodied on a computer readable medium for compiling a source program, the source program comprising one or more program modules, each program module comprising a first part which defines an interface and a second part which performs functions, said computer program comprising:

program module phase detection means for detecting a compilation phase, during compilation of a first program module, in which a second program module is being used, said second module not previously read during the compilation;

interrupting means for interrupting compilation on said detection;

first searching means, responsive to said detection, for searching automatically for the first part of the second program module;

reading means for reading the first part of the second program module; and resuming means for resuming the compilation of the first module after reading of said first part of the second program module.

* * * * *